United States Patent
Mizukami et al.

(10) Patent No.: US 10,352,243 B2
(45) Date of Patent: Jul. 16, 2019

(54) GAS TURBINE, GAS-TURBINE CONTROL DEVICE, AND GAS TURBINE OPERATION METHOD

(71) Applicant: MITSUBISHI HEAVY INDUSTRIES, LTD., Tokyo (JP)

(72) Inventors: Satoshi Mizukami, Tokyo (JP); Yoshiaki Yamaguchi, Tokyo (JP); Tetsu Konishi, Tokyo (JP); Toshio Takanezawa, Miyagi (JP); Hiroyuki Yamazaki, Miyagi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 480 days.

(21) Appl. No.: 15/022,966

(22) PCT Filed: Sep. 19, 2014

(86) PCT No.: PCT/JP2014/074944
§ 371 (c)(1),
(2) Date: Mar. 18, 2016

(87) PCT Pub. No.: WO2015/041346
PCT Pub. Date: Mar. 26, 2015

(65) Prior Publication Data
US 2016/0230663 A1    Aug. 11, 2016

(30) Foreign Application Priority Data

Sep. 20, 2013   (JP) .................................. 2013-195458

(51) Int. Cl.
*F02C 6/08*   (2006.01)
*F02C 7/08*   (2006.01)
(Continued)

(52) U.S. Cl.
CPC .................. *F02C 7/18* (2013.01); *F02C 3/13* (2013.01); *F02C 6/08* (2013.01); *F02C 7/12* (2013.01);
(Continued)

(58) Field of Classification Search
CPC ...... F02C 6/08; F02C 7/12; F02C 7/18; F01D 11/24; F01D 25/14; F05D 2260/205
(Continued)

(56) References Cited

U.S. PATENT DOCUMENTS 6,772,581 B2 * 8/2004 Ojiro ....................... F01D 11/24
                                                           415/114
8,210,801 B2   7/2012 Ballard, Jr. et al.
(Continued)

FOREIGN PATENT DOCUMENTS

CN   101517213   8/2009
CN   102112704   6/2011
(Continued)

OTHER PUBLICATIONS

Cicor Energy, "On/Off & Shut Off Valves", retrieved from http://www.circorpowerprocess.com/products/on-off-and-shut-off-valves.php on May 30, 2018.*
(Continued)

*Primary Examiner* — Gerald L Sung
*Assistant Examiner* — Stephanie Cheng
(74) *Attorney, Agent, or Firm* — Wenderoth, Lind & Ponack, L.L.P.

(57) ABSTRACT

A gas turbine equipped with a compressor, a combustion chamber and a turbine is further equipped with: a pressurizing device for taking a portion of the compressed air compressed by the compressor, and pressurizing the compressed air; a combustion chamber cooling line for cooling the combustion chamber using the pressurized compressed
(Continued)

air; a temperature regulating line for regulating the temperature of a stationary member of a blade ring or the like of a turbine by using the pressurized compressed air; a combustion chamber supply line through which the compressed air flows from the pressurizing device to the combustion chamber cooling line; a turbine supply line through which the compressed air flows from the pressurizing device to the temperature regulating line; a heater for heating the compressed air, provided in the turbine supply line; and a control device capable of controlling the heater.

10 Claims, 9 Drawing Sheets

(51) Int. Cl.
F02C 7/12 (2006.01)
F02C 7/14 (2006.01)
F02C 7/18 (2006.01)
F01D 25/10 (2006.01)
F02C 7/224 (2006.01)
F02C 7/141 (2006.01)
F02C 9/18 (2006.01)
F02C 3/13 (2006.01)

(52) U.S. Cl.
CPC ............ F02C 7/14 (2013.01); F02C 7/141 (2013.01); F02C 9/18 (2013.01); F01D 25/10 (2013.01); F02C 7/08 (2013.01); F02C 7/224 (2013.01); F05D 2260/205 (2013.01); F05D 2260/213 (2013.01)

(58) Field of Classification Search
USPC .......................................................... 60/782
See application file for complete search history.

(56) References Cited

U.S. PATENT DOCUMENTS

| 2001/0023581 | A1 | 9/2001 | Ojiro et al. | |
|---|---|---|---|---|
| 2009/0260342 | A1* | 10/2009 | Ishiguro | F02C 1/04 60/39.511 |
| 2009/0320477 | A1* | 12/2009 | Juchymenko | F01K 23/065 60/651 |
| 2011/0138818 | A1* | 6/2011 | Mizukami | F01D 11/24 60/778 |
| 2013/0040545 | A1* | 2/2013 | Finney | B64D 13/06 454/71 |
| 2013/0199153 | A1* | 8/2013 | Reed | F02C 9/18 60/204 |
| 2014/0301834 | A1* | 10/2014 | Pepperman | F01D 25/10 415/175 |

FOREIGN PATENT DOCUMENTS

| JP | 6-317184 | 11/1994 |
|---|---|---|
| JP | 2001-248406 | 9/2001 |
| JP | 2004-116485 | 4/2004 |
| JP | 2008-38807 | 2/2008 |
| JP | 2008-82247 | 4/2008 |
| JP | 2010-38071 | 2/2010 |
| JP | 2010-90816 | 4/2010 |
| JP | 2010-90817 | 4/2010 |
| JP | 2010-174886 | 8/2010 |
| JP | 5185762 | 4/2013 |
| JP | 5268957 | 8/2013 |
| JP | 2014-58979 | 4/2014 |
| WO | 2010/041552 | 4/2010 |

OTHER PUBLICATIONS

Yunus A. Cengel & Michael a Boles., "Thermodynamics: Chapter 7—Multistage Compression with Intercooling", 2004, 5th edition, pp. 367-369.*
International Search Report dated Nov. 11, 2014 in corresponding International Application No. PCT/JP2014/074944.
Notification of Reasons for Refusal dated Feb. 7, 2017 in corresponding Japanese Application No. 2014-191908 (with English translation).
English Translation of the Written Opinion of the International Searching Authority dated Nov. 11, 2014 in corresponding International Application No. PCT/JP2014/074944.
First Office Action dated Sep. 29, 2016 in corresponding Chinese Application No. 201480051610.2 (with English translation).

* cited by examiner

GAS TURBINE, GAS-TURBINE CONTROL DEVICE, AND GAS TURBINE OPERATION METHOD

TECHNICAL FIELD

The present invention pertains to a gas turbine, a gas turbine control device, and a gas turbine operation method.

BACKGROUND ART

Conventionally, a gas turbine provided with a so-called active clearance control (AAC) system is known. The AAC system regulates a gap (tip clearance) between a rotor blade and a blade ring of a turbine when starting a gas turbine (see Patent Document 1, for example). In such a gas turbine, the tip clearance is regulated by way of pressurizing a portion of compressed air compressed by a compressor with a pressurizing device and causing the pressurized compressed air to flow into a turbine cooling medium channel via a heating medium supply channel. Furthermore, in this gas turbine, a combustion chamber is cooled by causing the compressed air pressurized with the pressurizing device to flow into a combustion chamber cooling channel via a heating medium branch channel that branches from a heating medium supply channel (see FIG. 10 in Patent Document 1).

CITATION LIST

Patent Document

Patent Document 1: Japanese Unexamined Patent Application Publication No. 2010-90816A

SUMMARY OF INVENTION

Technical Problem

However, the temperature of the compressed air suitable for regulating the tip clearance and the temperature of the compressed air suitable for cooling the combustion chamber are different. In particular, compressed air that is at a high temperature during gas turbine startup operation and that is at a low temperature during gas turbine rated operation is preferable for tip clearance regulation. Meanwhile, compressed air that is at a low temperature is preferable for cooling the combustion chamber regardless of whether the gas turbine is in startup operation or rated operation.

Here, for the gas turbine of Patent Document 1, compressed air flowing into the turbine cooling medium channel and compressed air flowing into the combustion chamber cooling channel have the same temperature because the compressed air pressurized with the pressurizing device is supplied to both the turbine cooling medium channel and the combustion chamber cooling channel. At this time, if the temperature of the compressed air flowing out of the pressurizing device is low, suitably regulating the tip clearance is difficult because having the compressed air at a high temperature is difficult during gas turbine startup operation. Moreover, if the compressed air flowing out of the pressurizing device is at a high temperature, lowering the temperature of the compressed air during gas turbine startup operation is difficult. Consequently, a large volume of compressed air is required to flow through the combustion chamber in order to cool it, which may result in a decline in the gas turbine operation efficiency.

The present invention aims to solve the problems described above and an object thereof is to provide a gas turbine, a control device, and a gas turbine operation method that can suppress the decline in operational efficiency by separately regulating the temperature of the compressed air supplied to each of the combustion chamber and the turbine.

Solution to Problem

A gas turbine of the present invention acquires rotational power by supplying fuel to a combustion chamber and burning the fuel in compressed air compressed by a compressor and supplying generated combustion gas to a turbine. The gas turbine includes: means for pressurizing a portion of compressed air compressed by the compressor, the compressed air having been flowed into the means for pressurizing; means for cooling the combustion chamber with the compressed air pressurized by the means for pressurizing; means for regulating turbine temperature to regulate the temperature of a stationary member of the turbine with the compressed air pressurized by the means for pressurizing; a combustion chamber supply channel through which the compressed air flows from the means for pressurizing to the means for cooling the combustion chamber; a turbine supply channel through which the compressed air flows from the means for pressurizing to the means for regulating turbine temperature; at least one of first means for cooling the compressed air provided in the combustion chamber supply channel and a means for heating the compressed air provided in the turbine supply channel; and a control device capable of controlling at least one of the first means for cooling and the means for heating.

According to this configuration, the control device can regulate the temperature of the compressed air supplied to each of the means for regulating turbine temperature and the means for cooling the combustion chamber by controlling at least one of the first means for cooling and the means for heating. Specifically, if the compressed air pressurized by the means for pressurizing is at a low temperature, the compressed air can be suitably heated by providing the means for heating in the turbine supply channel and controlling the means for heating with the control device. As a result, the tip clearance for the turbine can be suitably regulated while cooling the combustion chamber. Meanwhile, if the compressed air pressurized by the means for pressurizing is at a high temperature, the compressed air can be suitably cooled by providing the first means for cooling in the combustion chamber supply channel and controlling the first means for cooling with the control device. As a result, the temperature of the compressed air supplied to the means for cooling the combustion chamber and the temperature of the compressed air supplied to the means for regulating turbine temperature can be regulated separately. Moreover, the control device may control the means for heating or the first means for cooling to regulate the temperature of the compressed air supplied to the means for cooling the combustion chamber and the temperature of the compressed air supplied to the means for regulating turbine temperature separately. From the above, a decline in the efficiency of the gas turbine operation can be suppressed because the compressed air can be at a temperature suitable for cooling the combustion chamber and the compressed air can be at a temperature suitable for regulating the tip clearance of the turbine.

Moreover, it is preferable that a first flow rate regulating mechanism be further provided in the turbine supply channel and the control device control the first flow rate regulating mechanism to regulate the flow rate of the compressed air flowing into the means for regulating turbine temperature.

According to this configuration, the temperature of the stationary member of the turbine can be accurately regulated to be a predetermined temperature by way of regulating the flow rate of the compressed air flowing into the means for regulating turbine temperature by controlling the first flow rate regulating mechanism with the control device.

Moreover, the control device preferably controls the first flow rate regulating mechanism to block supply of the compressed air to the means for regulating turbine temperature by closing the turbine supply channel.

According to this configuration, the tip clearance of the turbine can be more suitably regulated by suppressing the cooling of the stationary member of the turbine with the compressed air by way of blocking the supply of the compressed air to the means for regulating turbine temperature at predetermined timing by controlling the first flow rate regulating mechanism with the control device. Specifically, examples of the predetermined timing for blocking the supply of compressed air include timing before starting and during starting of the gas turbine and timing before stopping and during stopping of the gas turbine. Before starting and during starting of the gas turbine, the stationary member of the turbine is cool and the stationary member of the turbine can be suitably heated with combustion gas passing through the turbine by way of suppressing the cooling of the stationary member of the turbine by blocking the compressed air supply. Before stopping or during stopping of the gas turbine, the stationary member of the turbine is warm, and a temperature decrease in the warm stationary member of the turbine can be suppressed by controlling cooling of the stationary member of the turbine by blocking the compressed air supply. As a result, the stationary member of the turbine can be readily warmed when restarting the gas turbine after being stopped.

Moreover, the first flow rate regulating mechanism preferably has at least one of an on-off valve to open and close the turbine supply channel and a flow rate regulating valve for regulating the flow rate of the compressed air flowing through the turbine supply channel.

According to this configuration, the supply of the compressed air to the means for regulating turbine temperature can be regulated by using at least one of the on-off valve and the flow rate regulating valve. For example, when using only the flow rate regulating valve as the first flow rate regulating mechanism, not only is the flow rate of the compressed air regulated by way of regulating the degree that the flow rate regulating valve is open, but the supply of the compressed air to the means for regulating turbine temperature can be blocked by way of setting the degree that the flow rate regulating valve is open to zero. Moreover, when using the on-off valve and the flow rate regulating valve as the first flow rate regulating mechanism, regulating the degree that the flow rate regulating valve is open allows the flow rate of the compressed air to be regulated, and opening and closing the on-off valve allows the compressed air to the means for regulating turbine temperature to be supplied and blocked. Furthermore, when using only the on-off valve as the first flow rate regulating mechanism, opening or closing the on-off valve allows the compressed air to be supplied or blocked, and the compressed air can be suitably heated by controlling the means for heating with the control device.

Moreover, a pressurization supply channel through which the compressed air flows from the compressor to the means for pressurizing, and second means for cooling the compressed air that is provided in the pressurization supply channel are preferably further provided.

According to this configuration, the volume of compressed air flowing into the means for pressurizing can be small and the efficiency of the pressurization with the means for pressurizing can be improved because the compressed air flowing to the means for pressurizing can be cooled.

Moreover, a second flow rate regulating mechanism is further provided in the pressurization supply channel and the control device preferably controls the second flow rate regulating mechanism to regulate the flow rate of the compressed air flowing into the means for pressurizing.

According to this configuration, the overall flow rate of the compressed air flowing to the means for regulating turbine temperature and the means for cooling the combustion chamber can be regulated by way of regulating the flow rate of the compressed air flowing to the means for pressurizing by controlling the second flow rate regulating mechanism with the control device.

Moreover, a third flow rate regulating mechanism is further provided in the combustion chamber supply channel and the control device preferably controls the third flow rate regulating mechanism to regulate the flow rate of the compressed air flowing into the means for cooling the combustion chamber.

According to this configuration, the temperature of the combustion chamber can be accurately cooled to a predetermined temperature by way of regulating the flow rate of the compressed air flowing into the means for cooling the combustion chamber by controlling the third flow rate regulating mechanism with the control device.

Moreover, a connecting supply channel through which the compressed air flows from the means for regulating turbine temperature toward the means for cooling the combustion chamber, and a fourth flow rate regulating mechanism provided in the connecting supply channel are preferably further provided, and the control device preferably controls the fourth flow rate regulating mechanism to regulate the flow rate of the compressed air flowing from the means for regulating turbine temperature to the means for cooling the combustion chamber.

According to this configuration, the combustion chamber can be efficiently cooled by way of regulating the flow rate of the compressed air flowing from the means for regulating turbine temperature into the means for cooling the combustion chamber by controlling the fourth flow rate regulating mechanism with the control device.

Moreover, it is preferable that the control device preferably control at least one of the first means for cooling and the means for heating so that the combustion chamber is cooled by the means for cooling the combustion chamber and the stationary member of the turbine is heated by the means for regulating turbine temperature during startup operation and control at least one of the first means for cooling and the means for heating so that the combustion chamber is cooled by the means for cooling the combustion chamber and the stationary member of the turbine is cooled by the means for regulating turbine temperature during rated operation.

According to this configuration, during startup operation, the combustion chamber can be cooled and the stationary member of the turbine can be heated. Thus, the tip clearance can be regulated so that the rotor blade of the turbine does not come into contact with the stationary member of the turbine because the inner diameter of the stationary member can be increased with heat. Moreover, during rated operation, the combustion chamber can be cooled and the stationary member of the turbine can be cooled. Thus, the tip clearance can be regulated so that the gap with respect to the rotor blade of the turbine is decreased because the inner diameter of the stationary member can be reduced by cooling. From the above, during startup operation and rated operation, a decline in the efficiency of the gas turbine operation can be suppressed because the temperature of the compressed air can be suitable for cooling the combustion chamber, and the temperature of the compressed air can be suitable for regulating the tip clearance. Note that the control device controls each of the devices including the means for heating, first means for cooling, first flow rate regulating mechanism, second flow rate regulating mechanism, and third flow rate regulating mechanism, but the control device may be a single control device that can collectively control these devices or may include a plurality of control devices that can control the respective devices.

A gas turbine control device of the present invention controls operation of the gas turbine that acquires rotational power by supplying fuel to a combustion chamber and burning the fuel in the compressed air compressed by the compressor and supplying the generated combustion gas to the turbine. The gas turbine includes: means for pressurizing a portion of the compressed air compressed by the compressor, the compressed air having been flowed into the means for pressurizing; means for cooling the combustion chamber with the compressed air pressurized by the means for pressurizing; means for regulating turbine temperature to regulate the temperature of a stationary member of the turbine with the compressed air pressurized by the means for pressurizing; the combustion chamber supply channel through which the compressed air flows from the means for pressurizing to the means for cooling the combustion chamber; the turbine supply channel through which the compressed air flows from the means for pressurizing to the means for regulating turbine temperature; and at least one of first means for cooling the compressed air provided in the combustion chamber supply channel and means for heating the compressed air provided in the turbine supply channel. The control device controls at least one of the first means for cooling and the means for heating in startup operation mode, which is a control mode during startup of the gas turbine, so that the combustion chamber is cooled by the means for cooling the combustion chamber and the stationary member of the turbine is heated by the means for regulating turbine temperature, and controls at least one of the first means for cooling and the means for heating in rated operation mode, which is a control mode during rating of the gas turbine, so that the combustion chamber is cooled by the means for cooling the combustion chamber and the stationary member of the turbine is cooled by the means for regulating turbine temperature.

According to this configuration, the combustion chamber can be cooled and the stationary member of the turbine can be heated by way of executing startup operation mode. Thus, the tip clearance can be regulated so that the rotor blade of the turbine does not come into contact with the stationary member of the turbine because the inner diameter of the stationary member can be increased with heat. Moreover, the combustion chamber can be cooled and the stationary member of the turbine can be cooled by way of executing rated operation mode. Thus, the tip clearance can be regulated so that the gap with respect to the rotor blade of the turbine is decreased because the inner diameter of the stationary member can be reduced by cooling. From the above, in startup operation mode and rated operation mode, a decline in the efficiency of the gas turbine operation can be suppressed because the temperature of the compressed air can be suitable for cooling the combustion chamber, and the temperature of the compressed air can be suitable for regulating the tip clearance.

Moreover, the gas turbine preferably further includes a connecting supply channel through which the compressed air passes from the means for regulating turbine temperature to the means for cooling the combustion chamber, and a fourth flow rate regulating mechanism that is provided in the connecting supply channel. The compressed air preferably flows from the means for regulating turbine temperature to the means for cooling the combustion chamber by controlling the fourth flow rate regulating mechanism in the rated operation mode, which is the control mode during rating of the gas turbine.

According to this configuration, because compressed air flows from the means for regulating turbine temperature into the means for cooling the combustion chamber by way of executing rated operation mode, the compressed air after temperature regulation can be used for cooling the combustion chamber and the cooling of the combustion chamber can be performed efficiently.

The gas turbine operation method of the present invention is a method to operate the gas turbine that acquires rotational power by supplying fuel to a combustion chamber and burning the fuel in the compressed air compressed by the compressor and supplying the generated combustion gas to the turbine. The gas turbine includes: means for pressurizing a portion of the compressed air compressed by the compressor, the compressed air having been flowed into the means for pressurizing; means for cooling the combustion chamber with the compressed air pressurized by the means for pressurizing; means for regulating turbine temperature to regulate the temperature of a stationary member of the turbine with the compressed air pressurized by the means for pressurizing; the combustion chamber supply channel through which the compressed air flows from the means for pressurizing to the means for cooling the combustion chamber; the turbine supply channel through which the compressed air flows from the means for pressurizing to the means for regulating turbine temperature; and at least one of first means for cooling the compressed air provided in the combustion chamber supply channel and means for heating the compressed air provided in the turbine supply channel. The gas turbine operation method includes a startup operation to cool the combustion chamber by the means for cooling the combustion chamber and to heat the stationary member of the turbine by the means for regulating turbine temperature during startup operation of the gas turbine, and a rated operation to cool the combustion chamber by the means for cooling the combustion chamber and to cool the stationary member of the turbine by the means for regulating turbine temperature during rated operation of the gas turbine.

According to this configuration, the combustion chamber can be cooled and the stationary member of the turbine can be heated by way of executing the startup operation process. Thus, the tip clearance can be regulated so that the rotor blade of the turbine does not come into contact with the stationary member because the inner diameter of the stationary member can be increased with heat. Moreover, the combustion chamber can be cooled and the stationary member of the turbine can be cooled by way of executing the rated operation process. Thus, the tip clearance can be regulated so that the gap with respect to the rotor blade of the turbine is decreased because the inner diameter of the stationary member can be reduced by cooling. From the above, in the startup operation and rated operation, a decline in the efficiency of the gas turbine operation can be suppressed because the temperature of the compressed air can be suitable for cooling the combustion chamber, and the temperature of the compressed air can be suitable for regulating the tip clearance.

Moreover, the gas turbine preferably further includes the connecting supply channel through which compressed air passes from the means for regulating turbine temperature to the means for cooling the combustion chamber, and a fourth flow rate regulating mechanism that is provided in the connecting supply channel. The compressed air preferably flows from the means for regulating turbine temperature to the means for cooling the combustion chamber by controlling the fourth flow rate regulating mechanism in the rated operation process.

According to this configuration, because compressed air flows into the means for cooling the combustion chamber from the means for regulating turbine temperature by way of executing the rated operation, the compressed air after temperature regulation can be used for cooling the combustion chamber and the cooling of the combustion chamber can be performed efficiently.

DESCRIPTION OF EMBODIMENTS

Below, suitable embodiments of a gas turbine, a gas turbine control device, and a gas turbine operation method according to the present invention are described in detail with reference to the attached drawings. Note that the present invention is not limited by these embodiments, and when a plurality of embodiments is present, the present invention is intended to include a configuration combining these embodiments.

Embodiment 1

Figure 1:
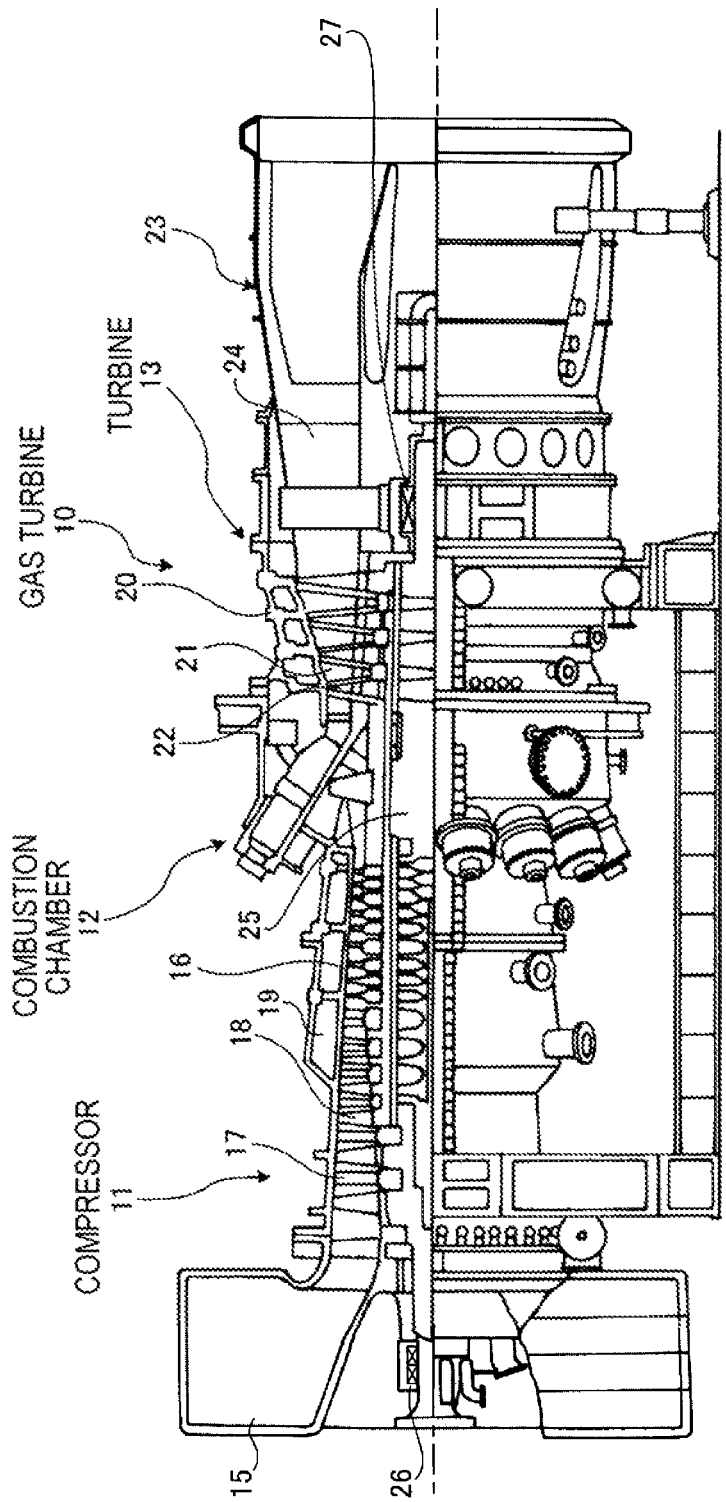
FIG. 1 is an overall schematic view illustrating a gas turbine of embodiment 1.
Figure 2:
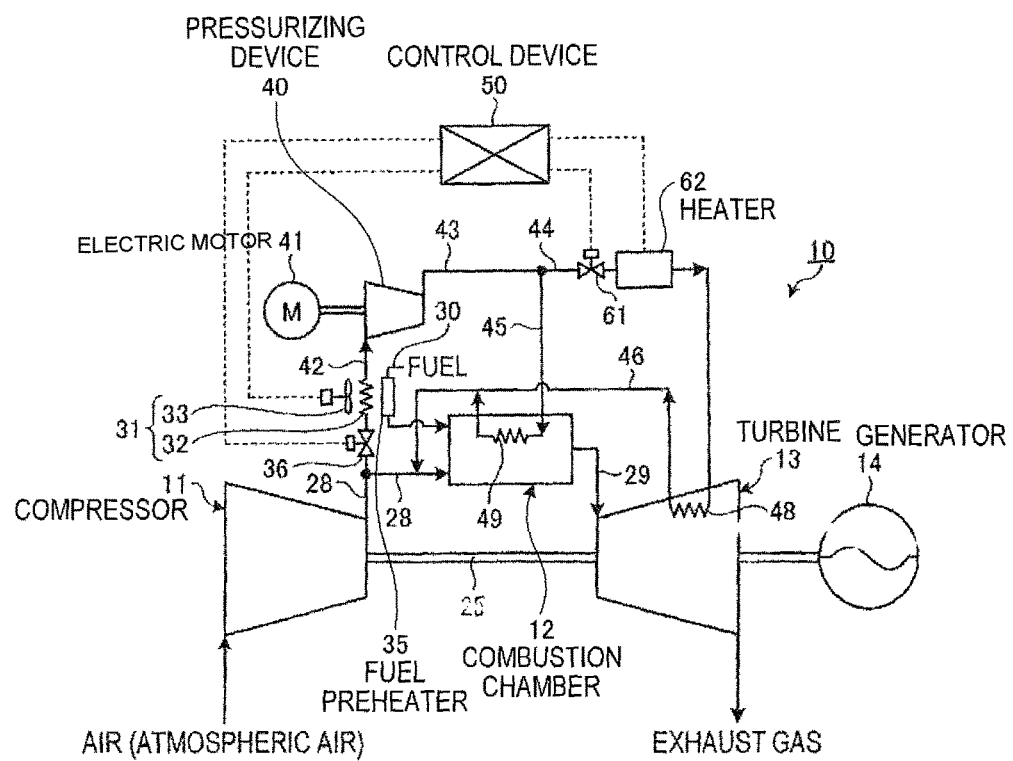
FIG. 2 is a schematic view schematically illustrating the gas turbine of embodiment 1.
Figure 3:
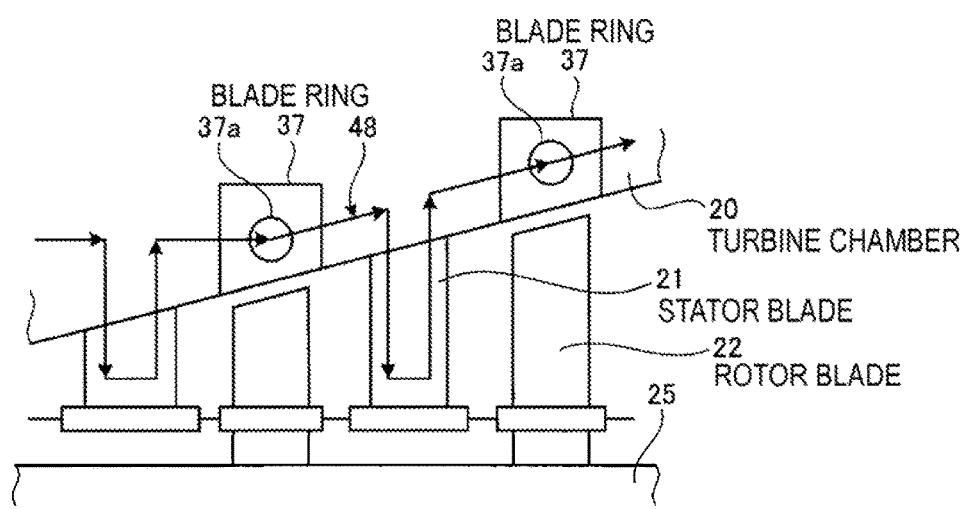
FIG. 3 is a schematic view of a temperature regulating line provided in a stationary member of a turbine.

FIG. 1 is an overall schematic view illustrating a gas turbine of embodiment 1. FIG. 2 is a schematic view schematically illustrating the gas turbine of embodiment 1. FIG. 3 is a schematic view of a temperature regulating line provided in a stationary member of a turbine.

As depicted in FIGS. 1 and 2, a gas turbine 10 includes a compressor 11, a combustion chamber 12, and a turbine 13. A power generator 14 is connected to the turbine 13. Moreover, the gas turbine 10 operation is controlled by a control device 50. The compressor 11 includes an air inlet 15 that takes in air. A plurality of stator blades 17 and rotor blades 18 are disposed alternately in a compressor chamber 16, and an air extracting manifold 19 is provided on the exterior of the compressor chamber 16. The combustion chamber 12 supplies fuel to compressed air compressed by the compressor 11, and the mixture can be burned by way of igniting with a burner. In the turbine 13, the stator blades 21 and the rotor blades 22 are alternately disposed in a turbine chamber 20.

An exhaust chamber 23 communicates with the turbine chamber 20 of the turbine 13, and the exhaust chamber 23 includes an exhaust diffuser 24 that is continuous with the turbine 13. Moreover, a rotor 25 is positioned so as to pass through the center portion of the compressor 11, combustion chamber 12, turbine 13, and exhaust chamber 23. The rotor 25 has one end on the compressor 11 side rotatably supported by a bearing 26 and has the other end on the exhaust chamber 23 side rotatably supported by a bearing 27. In addition, a plurality of disc plates are fixed to the rotor 25, and the rotor blades 18, 22 are coupled to the rotor 25, and a drive shaft of the power generator 14 is coupled to the end on the exhaust chamber 23 side.

Accordingly, the air taken in from the air inlet 15 of the compressor 11 are compressed by passing through the plurality of stator blades 17 and rotor blades 18 so as to be high temperature, high pressure compressed air. Combustion occurs in the combustion chamber 12 by supplying a predetermined fuel to the compressed air. In addition, high temperature, high pressure combustion gas generated in the combustion chamber 12 rotationally drives the rotor 25 by passing through the plurality of stator blades 21 and rotor blades 22 that constitute the turbine 13, which applies the rotational force to the power generator 14 coupled to the rotor 25 to generate power, converts the pressure of the exhaust gas to static pressure with the exhaust diffuser 24 in the exhaust chamber 23, and then discharges the exhaust gas to the outside.

In this manner, the compressed air compressed by the compressor 11 is supplied to the combustion chamber 12 in the gas turbine 10 of embodiment 1. Thus, as depicted in FIG. 2, the compressor 11 and the combustion chamber 12 are connected by a compressed air supply line 28, and the compressed air supply line 28 supplies the compressed air compressed by the compressor 11 to the combustion chamber 12.

Moreover, as depicted in FIG. 2, the gas turbine 10 includes a pressurizing device (pressurizing means) 40 to extract and pressurize a portion of the compressed air compressed by the compressor 11 from the compressed air supply line 28. The pressurizing device 40 and the compressed air supply line 28 are connected by a pressurization inflow line (pressurization supply channel) 42. The pressurization inflow line 42 branches from the compressed air supply line 28 and connects to the inlet side of the pressurizing device 40. The pressurization inflow line 42 extracts a portion of the compressed air flowing through the compressed air supply line 28 and supplies the extracted compressed air to the pressurizing device 40.

The pressurization inflow line 42 is provided with a flow rate regulating valve (second flow rate regulating mechanism) 36 and a cooler (second means for cooling) 31. The flow rate regulating valve 36, which is provided on the upstream side of the cooler 31 in the direction that the compressed air flows, regulates the volume of compressed air flowing to the pressurizing device 40 via the cooler 31. The flow rate regulating valve 36 is connected to the control device 50, and the control device 50 regulates the volume of compressed air by controlling the degree that the flow rate regulating valve 36 is open.

The cooler 31 includes a radiator 32 constituting a portion of the pressurization inflow line 42, and a fan 33 that blows air on the radiator 32. A fuel preheater 35 that preheats the fuel is provided adjacent to the radiator 32, and the radiator 32 and the fuel preheater 35 can exchange heat with each other. The fuel preheater 35 is provided in a fuel supply line 30 for supplying the fuel to the combustion chamber 12. The rotational speed of the fan 33 is controlled by the control device 50, and the volume of air blown against the radiator 32 is regulated by suitably varying the rotational speed. Thus, the cooler 31 cools the compressed air flowing through the radiator 32 by way of rotating the fan 33 and blowing air against the radiator 32, and causes heat radiated from the radiator 32 to be applied to fuel preheater 35, which preheats the fuel.

The pressurizing device 40 uses, for example, a compressor, or a blower. The pressurization inflow line 42 is connected to the inlet side of the pressurizing device 40, and a pressurization outflow line 43 is connected to the outlet side of the pressurizing device 40. The pressurizing device 40 provided with a dedicated electric motor 41 can operate independently from the compressor 11. The pressurizing device 40 supplies pressurized compressed air to each of the combustion chamber 12 and the turbine 13. The compressed air supplied to the combustion chamber 12 is used as cooling air to cool the combustion chamber 12, and the compressed air supplied to the turbine 13 is used as working air to regulate the tip clearance of the turbine 13. In addition, the pressurizing device 40 pressurizes the compressed air flowing in from the pressurization inflow line 42 and causes the pressurized compressed air to flow out to the pressurization outflow line 43.

The pressurization outflow line 43 branches into a turbine supply line (turbine supply channel) 44 for supplying the pressurized compressed air to the turbine 13, and a combustion chamber supply line (combustion chamber supply channel) 45 for supplying the pressurized compressed air to the combustion chamber 12. The turbine supply line 44 is connected to a temperature regulating line (means for regulating turbine temperature) 48 for regulating the temperature of the stationary member of the turbine 13. The combustion chamber supply line 45 is connected to the combustion chamber cooling line (means for cooling the combustion chamber) 49 for cooling the combustion chamber 12.

The turbine supply line 44 is provided with a flow rate regulating valve 61 functioning as the first flow rate regulating mechanism, and a heater (means for heating) 62. The first flow rate regulating mechanism regulates the volume of the compressed air flowing to the temperature regulating line 48 in the flow direction of the compressed air and consists of the flow rate regulating valve 61 in embodiment 1. The flow rate regulating valve 61, which is provided on the upstream side of a heater 62 in the flow direction of the compressed air, regulates the volume of the compressed air flowing to the temperature regulating line 48 via the heater 62. The flow rate regulating valve 61 is connected to the control device 50, and the control device 50 regulates the volume of compressed air by way of controlling the degree that the flow rate regulating valve 61 is open. The heater 62, which is provided on the downstream side of the flow rate regulating valve 61, heats the compressed air flowing to the temperature regulating line 48. The heater 62 is connected to the control device 50, and the control device 50 regulates the temperature of the compressed air by way of controlling the heating temperature of the heater 62.

As depicted in FIG. 3, the temperature regulating line 48 is a channel provided in the turbine chamber 20 serving as the stationary member, the stator blades 21, and blade rings 37. The blade ring 37 is provided facing the rotor blade 22 and is attached to the turbine chamber 20 so as to enclose the outer peripheral side of the rotor blade 22. The blade ring 37 is provided with a blade ring inner channel 37a formed over the entire periphery thereof. The temperature regulating line 48 regulates the gap (tip clearance) between the rotor blade 22 and the blade ring 37 by regulating the temperature and flow rate of the compressed air flowing through.

Specifically, the flow of heated compressed air through the temperature regulating line 48 heats the stationary member (the blade ring 37 of the turbine chamber 20 in particular), which increases the inner diameter of the blade ring 37. Thus, the tip clearance between the rotor blade 22 and the blade ring 37 increases. In contrast, the flow of cooled compressed air through the temperature regulating line 48 cools the stationary member, which decreases the inner diameter of the blade ring 37. Thus, the tip clearance between the rotor blade 22 and the blade ring 37 decreases. In this manner, the tip clearance can be regulated by causing the compressed air at a predetermined temperature to flow through the temperature regulating line 48 at a predetermined air volume. The compressed air passing through the temperature regulating line 48 flows into a compressed air return line 46.

The compressed air return line 46 is a channel connecting the temperature regulating line 48 and the compressed air supply line 28. The compressed air return line 46 is connected to the compressed air supply line 28 on the downstream side of the connecting section of the compressed air supply line 28 with the pressurization inflow line 42. The compressed air return line 46 causes the compressed air flowing in from the temperature regulating line 48 to merge into the compressed air supply line 28, and then to pass through the compressed air supply line 28 and flow into the combustion chamber 12.

The combustion chamber supply line 45 causes compressed air pressurized by the pressurizing device 40 to flow into the combustion chamber cooling line 49. The combustion chamber cooling line 49 uses the compressed air flowing in from the combustion chamber supply line 45 as cooling air. The combustion chamber cooling line 49 is a channel connecting the combustion chamber supply line 45 and the compressed air return line 46. The combustion chamber cooling line 49 has its inlet side connected to the combustion chamber supply line 45 and has its outlet side connected to the compressed air return line 46. The combustion chamber cooling line 49 cools the combustion chamber 12 with compressed air flowing in from the combustion chamber supply line 45, and causes the compressed air heated by way of cooling the combustion chamber 12 to merge into the compressed air return line 46.

The compressed air supply line 28 is connected to the combustion chamber 12. Moreover, the fuel supply line 30 is connected to the combustion chamber 12. The combustion chamber 12 mixes fuel and compressed air to generate mixed gas and burns the generated mixed gas, which generates combustion gas. In addition, the combustion gas flows into the turbine 13 through a combustion gas discharge line 29 connecting the combustion chamber 12 and the turbine 13.

Accordingly, the compressed air compressed in the compressor 11 is supplied to the combustion chamber 12 through the compressed air supply line 28. A portion of the compressed air extracted from the compressed air supply line 28 is supplied to the pressurizing device 40 through the pressurization inflow line 42. The volume of the compressed air passing through the pressurization inflow line 42 is suitably regulated by the flow rate regulating valve 36 and suitably cooled by the cooler 31. The compressed air supplied to the pressurizing device 40 is pressurized by the pressurizing device 40, and a portion of the pressurized compressed air is supplied to the temperature regulating line 48 through the turbine supply line 44 and the remainder is supplied to the combustion chamber cooling line 49 through the combustion chamber supply line 45. The volume of the compressed air passing through the turbine supply line 44 is suitably regulated by the flow rate regulating valve 61 and suitably heated by the heater 62. The compressed air flowing into the temperature regulating line 48 regulates the temperature of the stationary member of the turbine 13 to the predetermined temperature to regulate the tip clearance. The compressed air passing through the temperature regulating line 48 flows to the compressed air supply line 28 through the compressed air return line 46. The compressed air flowing into the combustion chamber cooling line 49 cools the combustion chamber 12. The compressed air passing through the combustion chamber cooling line 49 flows to the compressed air supply line 28 through the compressed air return line 46. Thus, the compressed air compressed by the compressor 11 is all supplied to the combustion chamber 12 through the compressed air supply line 28.

Supplying fuel from the fuel supply line 30 to compressed air supplied from the compressed air supply line 28 generates mixed gas, and burning the mixed gas generates combustion gas. Then, the high temperature, high pressure combustion gas generated in the combustion chamber 12 flows through the combustion gas discharge line 29 to the turbine 13 and passes through the stator blades 21 and the rotor blades 22 to rotationally drive the rotor 25, which generates power.

In this manner, the compressed air extracted from the compressed air supply line 28 is circulated to the compressed air supply line 28 through the compressed air return line 46. Thus, the channel for cooling the combustion chamber 12 is configured as a closed circulation channel (cooling channel that is a closed cycle). Similarly, the channel for regulating the tip clearance of the turbine 13 is configured as a closed circulation channel.

The control device 50 controls regulation of the tip clearance in the turbine 13 and controls cooling of the combustion chamber 12 in accordance with gas turbine 10 operation. Specifically, the control device 50 is in startup operation mode during startup operation of the gas turbine 10 and is in rated operation mode during rated operation of the gas turbine 10.

When the control device 50 is in startup operation mode, the compressed air is supplied as cooling air to the combustion chamber cooling line 49. Moreover, when the control device 50 is in startup operation mode, the control device 50 causes heated compressed air to be supplied to the temperature regulating line 48 to increase the inner diameter of the blade ring 37, so as to avoid contact between the rotor blade 22 and the blade ring 37. In other words, the control device 50 suitably controls the degree that the flow rate regulating valve 36 is open to suitably regulate the volume of the compressed air flowing from the compressor 11 to the pressurizing device 40 via the pressurization inflow line 42 and rotates the fan 33 of the cooler 31, which cools the compressed air flowing from the compressor 11 to the pressurizing device 40. The pressurizing device 40 pressurizes the cooled compressed air and supplies the pressurized compressed air to the combustion chamber cooling line 49 via the pressurization outflow line 43 and the combustion chamber supply line 45. As a result, the control device 50 causes the compressed air as cooling air to be supplied to the combustion chamber cooling line 49. Moreover, the pressurizing device 40 pressurizes the cooled compressed air and causes the pressurized compressed air to flow into the turbine supply line 44. By way of suitably controlling the degree the flow rate regulating valve 61 is open, the control device 50 suitably regulates the volume of the compressed air flowing from the pressurizing device 40 to the temperature regulating line 48 of the turbine 13 via the turbine supply line 44. Moreover, the control device 50 increases the temperature of the compressed air flowing into the temperature regulating line 48 by controlling the heating by the heater 62. As a result, the control device 50 supplies the heated compressed air to the temperature regulating line 48.

When the control device 50 is in rated operation mode, the compressed air is supplied as cooling air to the combustion chamber cooling line 49. Moreover, when the control device 50 is in rated operation mode, cooled compressed air is supplied to the temperature regulating line 48 in order to decrease the inner diameter of the blade ring 37 so as to decrease the tip clearance between the rotor blade 22 and the blade ring 37. In other words, the control device 50 is the same as in the startup operation mode with respect to control for cooling the combustion chamber 12. Meanwhile, the control device 50 differs from the startup operation mode with respect to control for regulating the tip clearance in the turbine 13. In other words, the pressurizing device 40 pressurizes the cooled compressed air and causes the pressurized compressed air to flow into the turbine supply line 44. By way of suitably controlling the degree the flow rate regulating valve 61 is open, the control device 50 suitably regulates the volume of the compressed air flowing from the pressurizing device 40 to the temperature regulating line 48 of the turbine 13 via the turbine supply line 44. Moreover, the control device 50 stops the heating by the heater 62 and keeps the temperature of the compressed air flowing to the temperature regulating line 48. As a result, the control device 50 supplies the compressed air in a cooled state to the temperature regulating line 48.

Next, the gas turbine operation method is described. The gas turbine 10 executes the startup operation process during startup operation and the rated operation process during rated operation. In the startup operation process, the combustion chamber 12 is cooled by supplying compressed air, as cooling air, to the combustion chamber cooling line 49 by way of the control device 50 of the gas turbine 10 executing startup operation mode. The stationary member (the blade ring 37 and the like) of the turbine 13 is heated by way of supplying heated compressed air to the temperature regulating line 48. Moreover, in the rated operation process, the combustion chamber 12 is cooled by supplying compressed air, as cooling air, to the combustion chamber cooling line 49 by way of the control device 50 of the gas turbine 10 executing rated operation mode. The stationary member (blade ring 37 and the like) of the turbine 13 is cooled by way of supplying compressed air in an unheated state as is to the temperature regulating line 48.

As described above, according to the configuration of embodiment 1, the control device 50 can regulate the temperature of the compressed air supplied to each of the turbine 13 and the combustion chamber 12 by way of controlling the cooler 31 and the heater 62. In other words, the temperature of compressed air flowing out from the pressurizing device 40 can be decreased by way of cooling the compressed air flowing into the pressurizing device 40 with the cooler 31. In addition, the control device 50 controls the heater 62 provided in the turbine supply line 44 to suitably heat the compressed air. As a result, the control device 50 can suitably regulate the tip clearance of the turbine 13 while cooling the combustion chamber 12. From the above, the control device 50 can control a decline in the efficiency of the gas turbine 10 operation because the temperature of the compressed air can be suitable for cooling the combustion chamber 12 and the temperature of the compressed air can be suitable for regulating the tip clearance of the turbine 13.

Moreover, according to the configuration of embodiment 1, the temperature of the stationary member of the turbine 13 can be accurately regulated to a predetermined temperature by way of regulating the flow rate of the compressed air flowing to the temperature regulating line 48 by controlling the flow rate regulating valve 61 with the control device 50.

Moreover, according to the configuration of embodiment 1, the volume of compressed air flowing into the pressurizing device 40 can be decreased and the pressurization efficiency of the pressurizing device 40 can be improved because the compressed air flowing into the pressurizing device 40 can be cooled by way of cooling the compressed air flowing through the pressurization inflow line 42 with the cooler 31.

Moreover, according to the configuration of embodiment 1, the entire flow rate of the compressed air flowing into the temperature regulating line 48 and the combustion chamber cooling line 49 can be regulated by way of regulating the flow rate of compressed air flowing into the pressurizing device 40 by controlling the flow rate regulating valve 36 with the control device 50.

Moreover, according to the configuration of embodiment 1, during startup operation of the gas turbine 10, the combustion chamber 12 can be cooled and the stationary member of the turbine 13 can be heated. Thus, the tip clearance can be regulated so that the rotor blade 22 of the turbine 13 does not come into contact with the blade ring 37 because the inner diameter of the stationary member of the blade ring 37 or the like can be increased with heat. Moreover, during rated operation of the gas turbine 10, the combustion chamber 12 can be cooled and the stationary member of the turbine 13 can be cooled. Thus, the tip clearance can be regulated so that the gap with respect to the rotor blade 22 of the turbine 13 is decreased because the inner diameter of the stationary member of the blade ring 37 or the like can be reduced by cooling. From the above, during startup operation and rated operation of the gas turbine 10, a decline in the efficiency of the gas turbine 10 operation can be suppressed because the temperature of the compressed air can be suitable for cooling the combustion chamber 12, and the temperature of the compressed air can be suitable for regulating the tip clearance of the turbine 13.

Note that in embodiment 1, the flow rate of the compressed air is regulated by using the flow rate regulating valves 36, 61, but the configuration is not limited to using the flow rate regulating valves 36, 61 and may be any configuration as long as a mechanism can regulate the flow rate of the compressed air.

Moreover, in embodiment 1, the flow rate regulating valve 61 and the heater 62 are provided, and the temperature of the stationary member of the turbine 13 is regulated by regulating the flow rate and temperature of the compressed air, but is not limited to this configuration. A configuration in which the flow rate regulating valve 61 is omitted may be employed as long as the temperature of the stationary member of turbine 13 can be regulated only by regulating the temperature of the compressed air with the heater 62.

Embodiment 2

Figure 4:
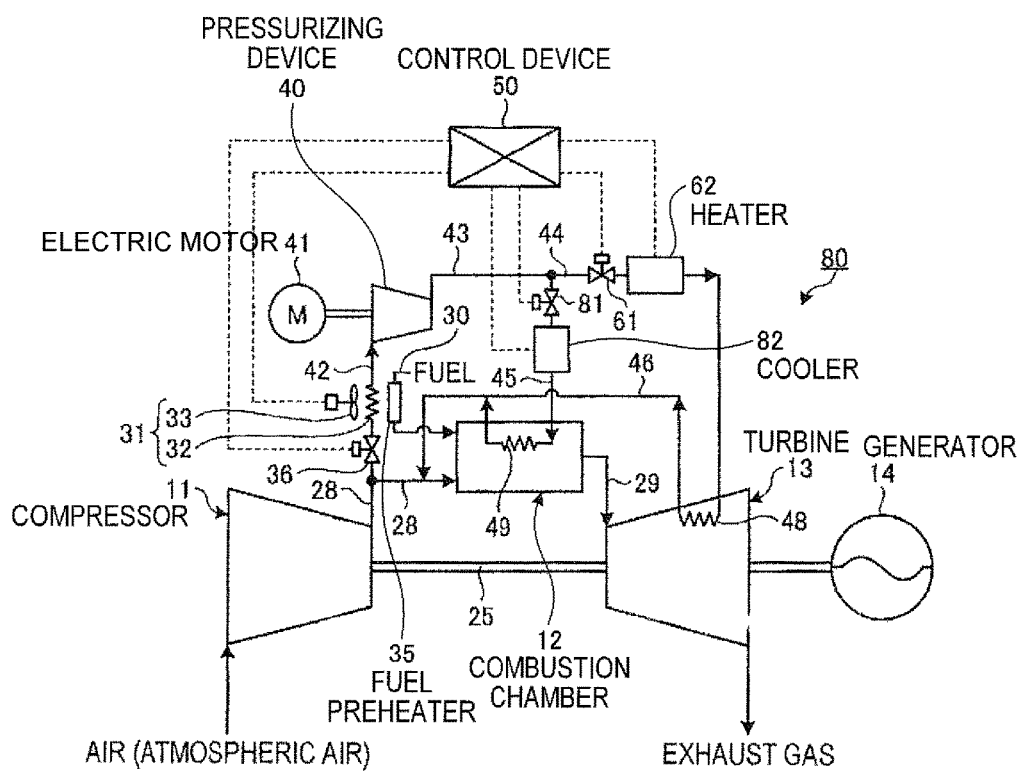
FIG. 4 is an overall schematic view illustrating a gas turbine of embodiment 2.

Next, a gas turbine 80 of embodiment 2 is described with reference to FIG. 4. FIG. 4 is an overall schematic view illustrating a gas turbine of embodiment 2. Note that in embodiment 2, in order to avoid duplicating the description in embodiment 1, portions differing from embodiment 1 are described and portions that are the same as in embodiment 1 are described with the same reference numerals as embodiment 1. The gas turbine 80 of embodiment 2 is configured so that a flow rate regulating valve (third flow rate regulating mechanism) 81 and a cooler (first means for cooling) 82 are provided in the combustion chamber supply line 45 of the gas turbine 10 of embodiment 1.

The flow rate regulating valve 81 is provided on the upstream side of the cooler 82 in the direction that the compressed air flows, and regulates the air volume of the compressed air flowing into the combustion chamber cooling line 49 via the cooler 82. The flow rate regulating valve 81 is connected to the control device 50, and the control device 50 regulates the volume of compressed air by way of controlling the degree that the flow rate regulating valve 81 is open. The cooler 82 is provided on the downstream side of the flow rate regulating valve 81 and cools the compressed air flowing into the combustion chamber cooling line 49. The cooler 82 is connected to the control device 50, and the control device 50 regulates the temperature of the compressed air by way of controlling the cooling temperature of the cooler 82.

Accordingly, a portion of the compressed air pressurized by the pressurizing device 40 is supplied to the combustion chamber cooling line 49 through the combustion chamber supply line 45. The volume of the compressed air passing through the combustion chamber supply line 45 is suitably regulated by the flow rate regulating valve 81 and suitably cooled by the cooler 82.

As described above, according to the configuration of embodiment 2, the control device 50 can regulate the temperature of the compressed air supplied to the combustion chamber 12 by way of controlling the cooler 82. In other words, the compressed air is suitably cooled by controlling the cooler 82 provided in the combustion chamber supply line 45 even if the temperature of the compressed air flowing out from the pressurizing device 40 is high. As a result, the control device 50 can suitably cool the combustion chamber 12.

Moreover, according to the configuration of embodiment 2, controlling the flow rate regulating valve 81 with the control device 50 and regulating the flow rate of the compressed air flowing into the combustion chamber cooling line 49 makes it possible to accurately cool the temperature of the combustion chamber 12 to a predetermined temperature.

Note that also in embodiment 2, the flow rate of the compressed air is regulated with the flow rate regulating valve 81 but the configuration is not limited to being regulated with the flow rate regulating valve 81 and may be any configuration as long as a mechanism can regulate the flow rate of the compressed air.

Moreover, in embodiment 2, the flow rate regulating valve 81 and the cooler 82 are provided, and the combustion chamber 12 is cooled by regulating the flow rate and temperature of the compressed air, but is not limited to this configuration. The flow rate regulating valve 81 may be omitted as long as only cooling the compressed air by the cooler 82 allows the combustion chamber 12 to be cooled.

Embodiment 3

Figure 5:
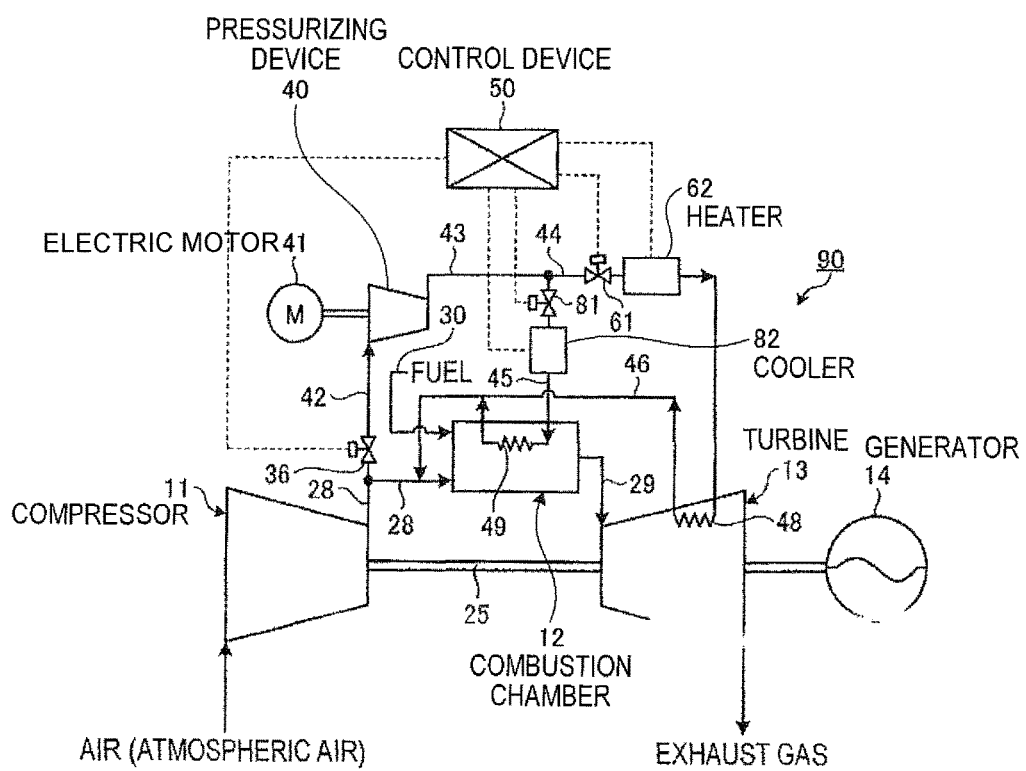
FIG. 5 is an overall schematic view illustrating a gas turbine of embodiment 3.

Next, a gas turbine 90 of embodiment 3 is described with reference to FIG. 5. FIG. 5 is an overall schematic view illustrating a gas turbine of embodiment 3. Note that in embodiment 3, in order to avoid duplicating the description in embodiment 2, portions differing from embodiment 2 are described and portions that are the same as in embodiment 2 are described with the same reference numerals as embodiment 2. The gas turbine 90 of embodiment 3 has a configuration in which the cooler 31 provided in the pressurization inflow line 42 of the gas turbine 80 of embodiment 2 is omitted.

Thus, the compressed air flowing through the pressurization inflow line 42 is supplied to the pressurizing device 40 without being cooled. The volume of the compressed air passing through the pressurization inflow line 42 is suitably regulated by the flow rate regulating valve 36. The compressed air supplied to the pressurizing device 40 is pressurized by the pressurizing device 40, and a portion of the pressurized compressed air is supplied to the temperature regulating line 48 through the turbine supply line 44 and the remainder is supplied to the combustion chamber cooling line 49 through the combustion chamber supply line 45.

As described above, according to the configuration of embodiment 3, the compressed air flowing through the pressurization inflow line 42 is supplied to the pressurizing device 40 without being cooled. Thus, the compressed air flowing out of the pressurizing device 40 is supplied to both the turbine supply line 44 and the combustion chamber supply line 45 at a higher temperature than in embodiment 2. In addition, the control device 50 controls the heater 62 provided in the turbine supply line 44 to suitably heat the compressed air and controls the cooler 82 provided in the combustion chamber supply line 45 to suitably cool the compressed air. As a result, the control device 50 can suitably regulate the tip clearance of the turbine 13 while cooling the combustion chamber 12. From the above, the control device 50 can control a decline in the efficiency of the gas turbine 10 operation because the temperature of the compressed air can be suitable for cooling the combustion chamber 12, and the temperature of the compressed air can be suitable for regulating the tip clearance of the turbine 13.

Note that in embodiment 3, the configuration is provided with the heater 62 in the turbine supply line 44, but is not limited to this configuration. A configuration in which the heater 62 is omitted may be employed as long as the temperature of the compressed air flowing out of the pressurizing device 40 is sufficiently high and the temperature of the stationary member of the turbine 13 can be regulated by only regulating the flow rate of the compressed air with the flow rate regulating valve 61.

Embodiment 4

Figure 6:
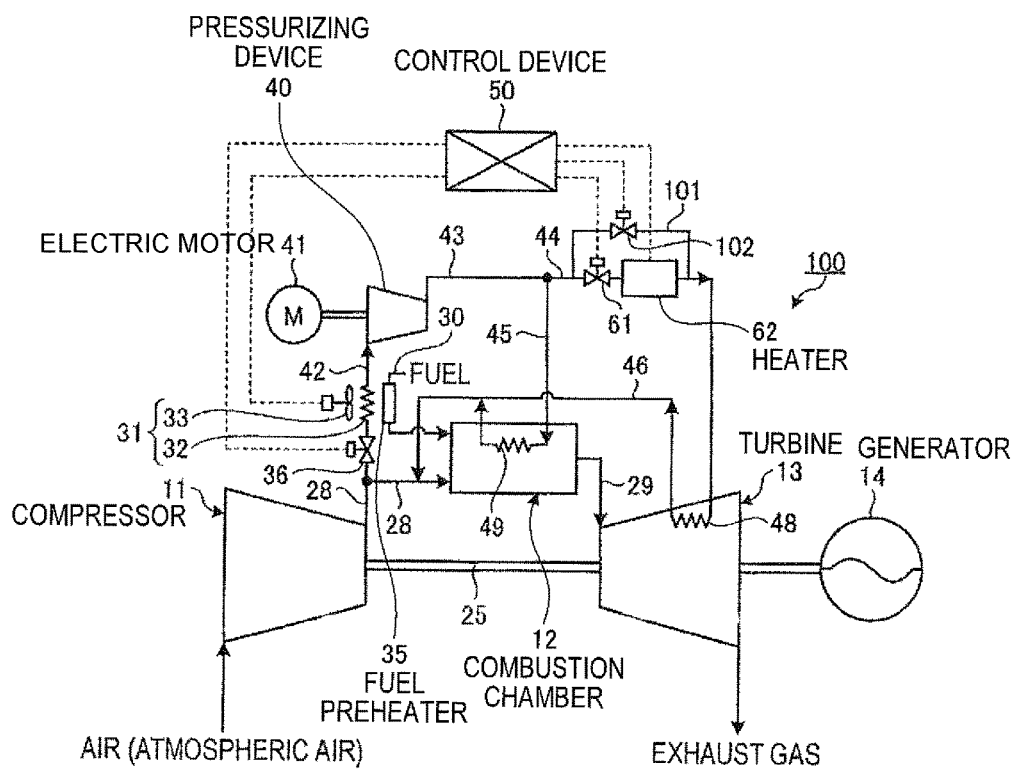
FIG. 6 is an overall schematic view illustrating a gas turbine of embodiment 4.

Next, a gas turbine 100 of embodiment 4 is described with reference to FIG. 6. FIG. 6 is an overall schematic view illustrating a gas turbine of embodiment 4. Note that in embodiment 4, in order to avoid duplicating the description in embodiment 1, portions differing from embodiment 1 are described and portions that are the same as in embodiment 1 are described with the same reference numerals as embodiment 1. The gas turbine 100 of embodiment 4 is provided with a bypass line 101 for bypassing the heater 62 provided in the turbine supply line 44 of the gas turbine 10 in embodiment 1.

As depicted in FIG. 6, the inlet side of the bypass line 101 is connected to the turbine supply line 44 on the upstream side of the flow rate regulating valve 61, and the outlet side of the bypass line 101 is connected to the turbine supply line 44 on the downstream side of the heater 62. The bypass line 101 is provided with a flow rate regulating valve 102, and the flow rate regulating valve 102 regulates the volume of the compressed air flowing through the bypass line 101. This flow rate regulating valve 102 is connected to the control device 50, and the control device 50 regulates the flow rate of the compressed air flowing through the bypass line 101 by way of controlling the degree that the flow rate regulating valve 102 is open.

The bypass line 101 is used for mixing compressed air heated by the heater 62 with compressed air not heated by the heater 62 to regulate the mixed compressed air to a predetermined temperature. Thus, if the compressed air is not to be heated, closing the flow rate regulating valve 61 and opening the flow rate regulating valve 102 causes the entire volume of compressed air flowing into the turbine supply line 44 to flow into the bypass line 101.

As described above, according to the configuration of embodiment 4, the compressed air after being mixed can be regulated to a predetermined temperature even when regulating the temperature of the compressed air with the heater 62 is difficult or when the heater 62 has no temperature regulating function.

Note that embodiment 4 is provided with the bypass line 101 for bypassing the heater 62, but may be provided with a bypass line for bypassing the cooler 82 in embodiment 3.

Embodiment 5

Figure 7:
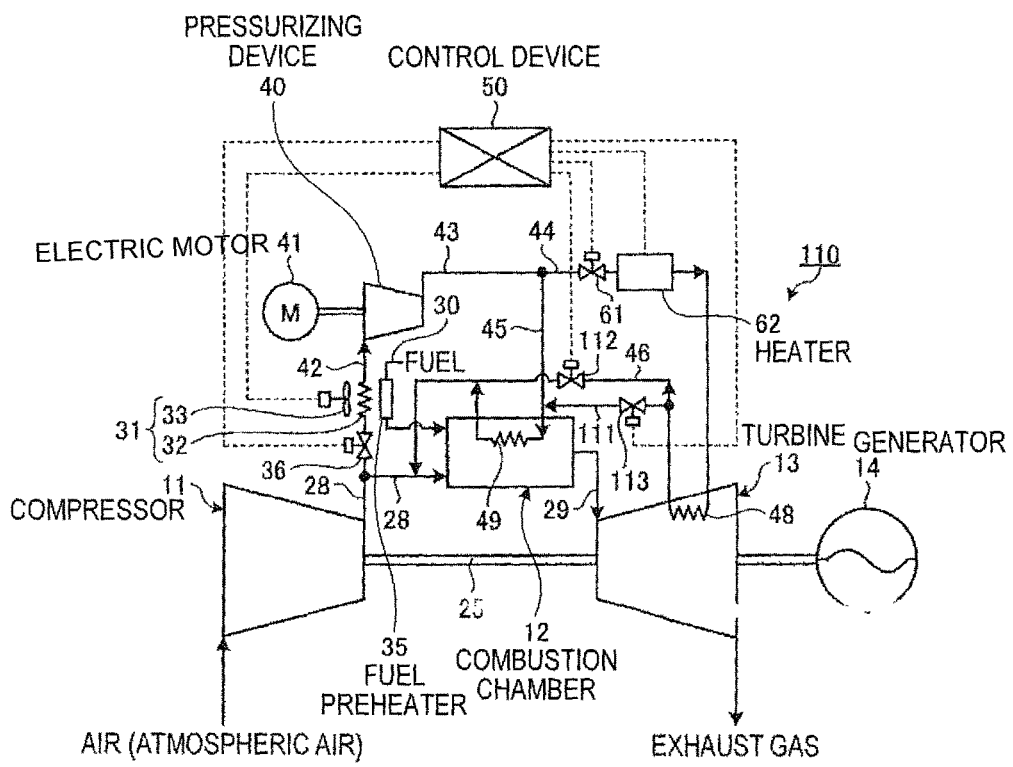
FIG. 7 is an overall schematic view illustrating a gas turbine of embodiment 5.

Next, a gas turbine 110 of embodiment 5 is described with reference to FIG. 7. FIG. 7 is an overall schematic view illustrating a gas turbine of embodiment 5. Note that also in embodiment 5, in order to avoid duplicating the descriptions in embodiment 1, portions differing from embodiment 1 are described and portions that are the same as in embodiment 1 are described with the same reference numerals as embodiment 1. The gas turbine 110 of embodiment 5 is provided with a connecting supply line (connecting supply channel) 111 that branches from the temperature regulating line 48 of the gas turbine 10 of embodiment 1 and connecting to the combustion chamber supply line 45.

As depicted in FIG. 7, the inlet side of the connecting supply line 111 is connected to the temperature regulating line 48 on the downstream side of the turbine 13, and the outlet side is connected to the combustion chamber supply line 45 on the upstream side of the combustion chamber 12. The compressed air return line 46 connected to the temperature regulating line 48 is provided with a flow rate regulating valve 112, and the flow rate regulating valve 112 regulates the volume of the compressed air flowing through the compressed air return line 46. Moreover, the connecting supply line 111 is provided with a flow rate regulating valve (fourth flow rate regulating mechanism) 113, and the flow rate regulating valve 113 regulates the volume of the compressed air flowing through the connecting supply line 111. The flow rate regulating valve 112 and the flow rate regulating valve 113 are connected to the control device 50, and the control device 50 regulates the flow rate of the compressed air flowing through the compressed air return line 46 and the connecting supply line 111 by controlling the degree that the flow rate regulating valve 112 and the flow rate regulating valve 113 are opened.

The connecting supply line 111 that causes the compressed air that has passed through the turbine 13 to flow into the combustion chamber supply line 45 is used to cool the combustion chamber 12 with compressed air that has passed through the turbine 13. The control device 50 regulates the volume of the compressed air to the combustion chamber supply line 45 and the compressed air return line 46 by suitably regulating the degree that the flow rate regulating valve 112 and flow rate regulating valve 113 are opened in accordance with the gas turbine 10 operation.

Specifically, during startup operation (startup operation mode) of the gas turbine 10, the control device 50 opens the flow rate regulating valve 112 and regulates the degree that the flow rate regulating valve 113 is open to be less than the flow rate regulating valve 112 in order to supply compressed air heated by the heater 62 to the temperature regulating line 48. Thus, more compressed air that has passed through the turbine 13 flows to the compressed air return line 46 than to the connecting supply line 111. Note that during startup operation mode, the control device 50 may close the flow rate regulating valve 113, and in this case, the compressed air that has passed through the turbine 13 flows only into the compressed air return line 46.

Meanwhile, during rated operation (rated operation mode) of the gas turbine 10, the control device 50 opens the flow rate regulating valve 113 and regulates the degree that the flow rate regulating valve 112 is open to be less than the flow rate regulating valve 113 in order to supply compressed air in a cooled state to the temperature regulating line 48. Thus, more compressed air that has passed through the turbine 13 flows to the connecting supply line 111 than to the compressed air return line 46. Note that during rated operation mode, the control device 50 may close the flow rate regulating valve 112, and in this case, the compressed air that has passed through the turbine 13 flows only into the combustion chamber supply line 45 via the connecting supply line 111.

As described above, according to the configuration of embodiment 5, during rated operation of the gas turbine 10, the compressed air that has passed through the turbine 13 can be caused to flow from the temperature regulating line 48 into the combustion chamber supply line 45 via the connecting supply line 111. As a result, the combustion chamber 12 can be cooled efficiently and the gas turbine 10 efficiency during rated operation can be improved because the compressed air that has passed through the turbine 13 can be used to cool the combustion chamber 12.

Embodiment 6

Next, a gas turbine 10 of embodiment 6 is described. Note that also with embodiment 6, in order to avoid duplicating the descriptions in embodiments 1 to 5, portions differing from embodiments 1 to 5 are described and portions that are the same as in embodiments 1 to 5 are described with the same reference numerals as embodiment 1. The gas turbine 10 of embodiment 6 blocks at predetermined timing the supply of compressed air to the temperature regulating line 48 by using the flow rate regulating valve 61 provided in the gas turbine 10 of embodiment 1. Below, the gas turbine 10 is described in embodiment 6 with reference to FIG. 2.

As depicted in FIG. 2, the turbine supply line 44 is provided with only the flow rate regulating valve 61 that functions as the first flow rate regulating mechanism. The flow rate regulating valve 61 is connected to the control device 50, and the control device 50, at predetermined timing, blocks the compressed air to be supplied to the temperature regulating line 48 by way of setting the degree that the flow rate regulating valve 61 is open to zero. Here, examples of the predetermined timing include timing before starting and during starting of the gas turbine 10, and timing before stopping and during stopping of the gas turbine 10.

When before starting or during starting (startup operation mode) of the gas turbine 10 is the predetermined timing, the blade ring 37 of the turbine 13 is in a cooled state. Before startup or during startup of the gas turbine 10, the control device 50 blocks supply of the compressed air to the temperature regulating line 48 by setting the degree that the flow rate regulating valve 61 is open to zero. Then, the cooling of the blade ring 37 of the turbine 13 is suppressed because the compressed air flowing through the temperature regulating line 48 is stopped. Meanwhile, the combustion gas passes through the turbine 13, and then the combustion gas heats the blade ring 37 of the turbine 13. Thus, before startup or during startup of the gas turbine 10, the control device 50 can increase the inner diameter of the blade ring 37 in order to avoid contact between the rotor blade 22 and the blade ring 37.

When before stopping or during stopping is the predetermined timing, the blade ring 37 of the turbine 13 is warmed and the temperature of the combustion gas passing through the turbine 13 is decreased. Before stopping or during stopping of the gas turbine 10, the control device 50 blocks supply of the compressed air to the temperature regulating line 48 by setting the degree that the flow rate regulating valve 61 is open to zero. Then, the cooling of the blade ring 37 of the turbine 13 is suppressed because the compressed air flowing through the temperature regulating line 48 is stopped. Thus, a decrease in the temperature of the warmed blade ring 37 of the turbine 13 is suppressed. As a result, the control device 50 can suppress the inner diameter of the blade ring 37 from decreasing before stopping or during stopping of the gas turbine 10. Thereby, the blade ring 37 of the turbine 13 can be readily warmed when restarting the gas turbine 10 after stopping.

As described above, according to the configuration of embodiment 6, the tip clearance of the turbine 13 can be more suitably regulated because the inner diameter of the blade ring 37 of the turbine 13 can be increased by controlling the cooling of the blade ring 37 of the turbine 13 with compressed air by way of blocking the supply of compressed air to the temperature regulating line 48 at predetermined timing by controlling the flow rate regulating valve 61 with the control device 50.

Moreover, according to the configuration of embodiment 6, the supply of compressed air to the temperature regulating line 48 can be blocked by using only the flow rate regulating valve 61 without changing the configuration of the gas turbine 10 of embodiment 1.

Embodiment 7

Figure 8:
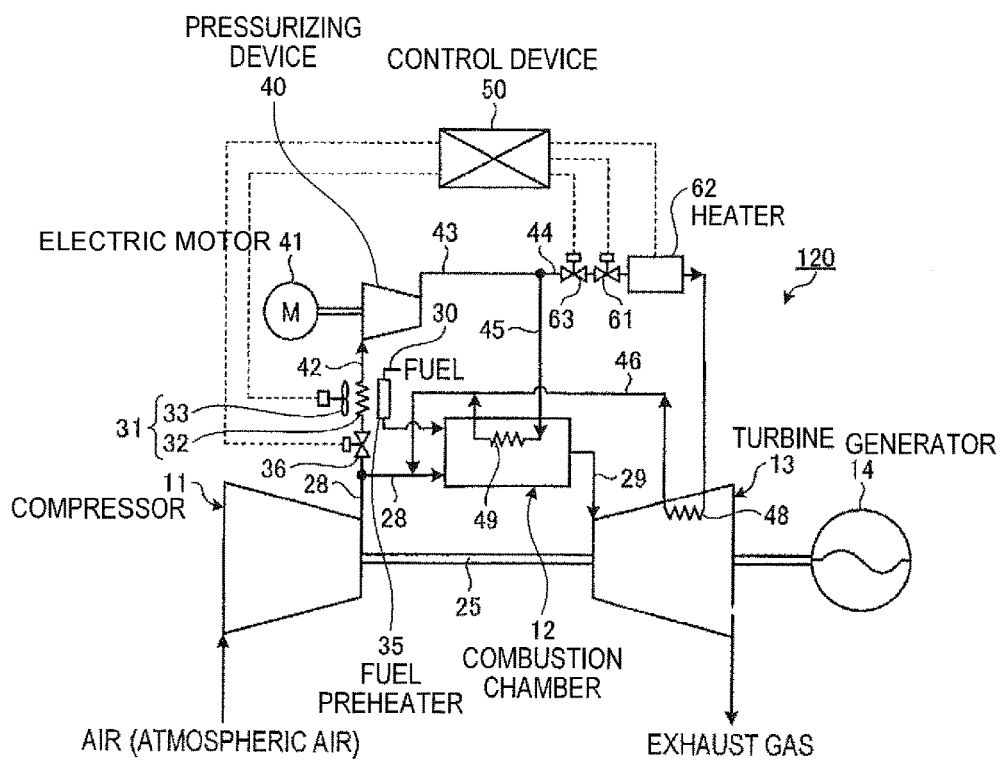
FIG. 8 is an overall schematic view illustrating a gas turbine of embodiment 7.

Next, a gas turbine 120 of embodiment 7 is described with reference to FIG. 8. FIG. 8 is an overall schematic view illustrating a gas turbine of embodiment 7. Note that also with embodiment 7, in order to avoid duplicating the descriptions in embodiments 1 to 6, portions differing from embodiments 1 to 6 are described and portions that are the same as in embodiments 1 to 6 are described with the same reference numerals as embodiment 1. The gas turbine 120 of embodiment 7 blocks at predetermined timing the supply of compressed air to the temperature regulating line 48 with an on-off valve 63.

As depicted in FIG. 8, the gas turbine 120 of embodiment 7 has a configuration in which the on-off valve 63 is provided in the turbine supply line 44 of the gas turbine 10 of embodiment 1. In other words, the turbine supply line 44 is provided with a flow rate regulating valve 61 and the on-off valve 63 that function together as the first flow rate regulating mechanism. The on-off valve 63 is provided on the upstream side in the flow direction of the compressed air of the flow rate regulating valve 61 and the heater 62 and switches between supplying and blocking the compressed air to the temperature regulating line 48 by opening or closing the turbine supply line 44.

The flow rate regulating valve 61 is connected to the control device 50, and the control device regulates the volume of the compressed air flowing into the temperature regulating line 48 by controlling the degree that the flow rate regulating valve 61 is open. Moreover, the on-off valve 63 is connected to the control device 50, and the control device 50, at predetermined times, blocks the compressed air supplied to the temperature regulating line 48 by way of setting the degree that the on-off valve 63 is open to zero (closes the valve). Here, the predetermined timing includes timing before starting and during starting of the gas turbine 120, and timing before stopping and during stopping of the gas turbine 120 as in embodiment 6. Note that a description of the control of the on-off valve 63 by the control device 50 before starting and during starting the gas turbine 120 and control of the on-off valve 63 by the control device 50 before stopping and during stopping of the gas turbine 120 are omitted because the control is the same as the control of the flow rate regulating valve 61 in embodiment 6. Note that the degree that the flow rate regulating valve 61 is open is not particularly restricted and may be zero to match the closed state of the on-off valve 63 and may be a predetermined degree of opening.

As described above, according to the configuration of embodiment 7, controlling the on-off valve 63 with the control device 50 to block the supply of compressed air to the temperature regulating line 48 at predetermined timing suppresses the blade ring 37 of the turbine 13 from being cooled with the compressed air to allow the inner diameter of the blade ring 37 of the turbine 13 to be increased, which makes it possible to more suitably regulate the tip clearance of the turbine 13.

Note that in embodiment 7, the on-off valve 63 is provided on the upstream side of the flow rate regulating valve 61 and the heater 62 in the direction that the compressed air flows, but the on-off valve 63 may be provided between the flow rate regulating valve 61 and the heater 62.

Embodiment 8

Figure 9:
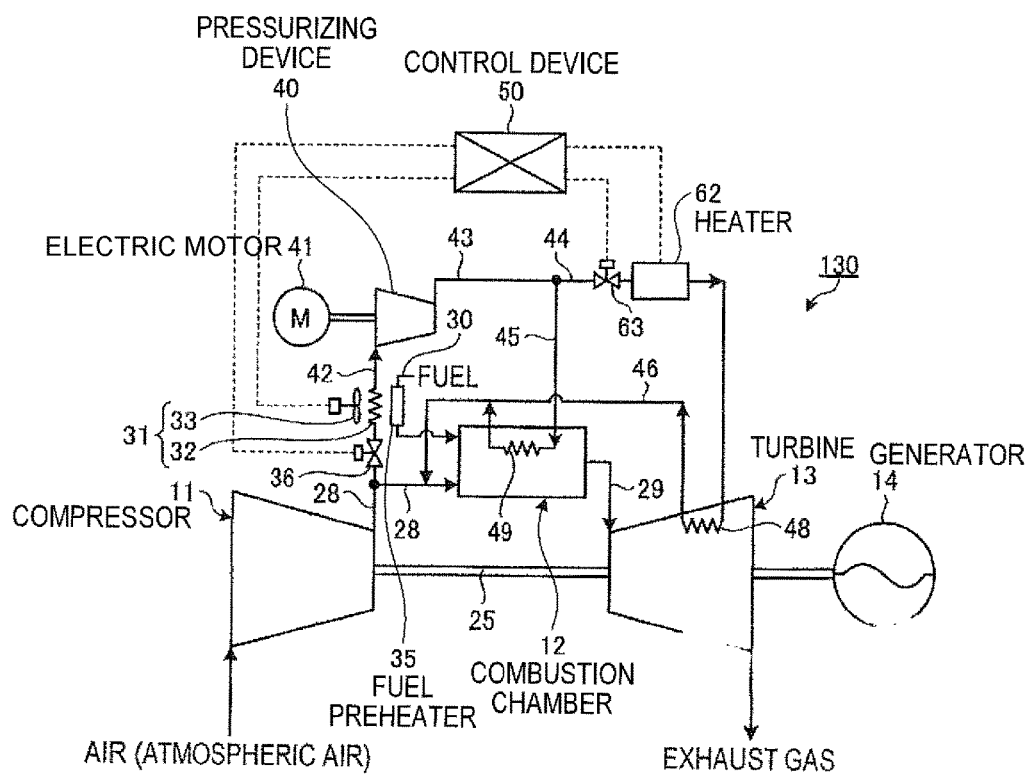
FIG. 9 is an overall schematic view illustrating a gas turbine of embodiment 8.

Next, a gas turbine 130 of embodiment 8 is described with reference to FIG. 9. FIG. 9 is an overall schematic view illustrating a gas turbine of embodiment 8. Note that also with embodiment 8, in order to avoid duplicating the descriptions in embodiments 1 to 7, portions differing from embodiments 1 to 7 are described and portions that are the same as in embodiments 1 to 7 are described with the same reference numerals as embodiment 1. The gas turbine 130 of embodiment 8 blocks at predetermined timing the supply of compressed air to the temperature regulating line 48 by using the on-off valve 63 provided in place of the flow rate regulating valve 61 of embodiment 1.

As depicted in FIG. 9, the gas turbine 130 of embodiment 8 has a configuration in which the on-off valve 63 is provided in place of the flow rate regulating valve 61 provided in the turbine supply line 44 of the gas turbine 10 of embodiment 1. In other words, the turbine supply line 44 is provided only with the on-off valve 63 that functions as the first flow rate regulating mechanism. The on-off valve 63 is provided on the upstream side in the flow direction of the compressed air of the heater 62 and switches between supplying the compressed air and blocking the supply of the compressed air to the temperature regulating line 48 by opening or closing the turbine supply line 44. The on-off valve 63 is connected to the control device 50, and the control device 50, at predetermined timing, sets the degree that the on-off valve 63 is open to zero, so as to block the compressed air to be supplied to the temperature regulating line 48. Here, the predetermined timing includes timing before starting and during starting of the gas turbine 130, and timing before stopping and during stopping of the gas turbine 130 as in embodiment 6. Note that a description of the control of the on-off valve 63 by the control device 50 before starting and during starting the gas turbine 130 and control of the on-off valve 63 by the control device 50 before stopping and during stopping of the gas turbine 130 are omitted because the control is the same as the control of the flow rate regulating valve 61 in embodiment 6. Moreover, during rated operation of the gas turbine 130, the control device 50 opens the on-off valve 63 in order to supply compressed air to the temperature regulating line 48. At this time, the temperature of the compressed air to be supplied to the temperature regulating line 48 is suitably regulated by controlling cooling by the cooler 31 and controlling heating by the heater 62 with the control device 50.

As described above, according to the configuration of embodiment 8, controlling the on-off valve 63 with the control device 50 to block the supply of compressed air to the temperature regulating line 48 at predetermined timing suppresses the blade ring 37 of the turbine 13 from being cooled with the compressed air to allow the inner diameter of the blade ring 37 of the turbine 13 to be increased, which makes it possible to more suitably regulate the tip clearance of the turbine 13.

Moreover, according to the configuration of embodiment 8, the on-off valve 63 is provided in place of the flow rate regulating valve 61 of the gas turbine 10 in embodiment 1, and the supply of compressed air to the temperature regulating line 48 can be blocked by using only the on-off valve 63.

Note that in embodiments 6 to 8, the supply of compressed air is blocked according to the configuration of the gas turbine 10 of embodiment 1 but is not limited to this configuration. In other words, the configurations in embodiments 6 to 8 may be applied to the configurations of the gas turbine 10 in embodiments 2 to 5.

Moreover, in embodiments 1 to 8, the control device 50 collectively controls each of the devices including the cooler 31 as the second means for cooling, the heater 62 as the means for heating, the cooler 82 as the first means for cooling, and a plurality of flow rate regulating valves 36, 61, 81, 102, but is not limited to this configuration, and a plurality of control devices that can control the respective devices may be provided.

REFERENCE SIGNS LIST

10 Gas turbine
11 Compressor

12 Combustor
13 Turbine
14 Generator
28 Compressed air supply line
29 Combustion gas discharge line
30 Fuel supply line
31 Cooler
32 Radiator
33 Fan
35 Fuel preheater
36 Flow rate regulating valve
37 Blade ring
37a Blade ring inner channel
40 Pressurizing device
41 Electric motor
42 Pressurization inflow line
43 Pressurization outflow line
44 Turbine supply line
45 Combustion chamber supply line
46 Compressed air return line
48 Temperature regulating line
49 Combustion chamber cooling line
50 Control device
61 Flow rate regulating valve
62 Heater
80 Gas turbine (embodiment 2)
81 Flow rate regulating valve
82 Cooler
90 Gas turbine (embodiment 3)
100 Gas turbine (embodiment 4)
101 Bypass line
102 Flow rate regulating valve
110 Gas turbine (embodiment 5)
111 Connecting supply line
112 Flow rate regulating valve
113 Flow rate regulating valve
120 Gas turbine (embodiment 7)
130 Gas turbine (embodiment 8)

The invention claimed is:

1. A gas turbine configured to acquire rotational power by supplying fuel to a combustion chamber and burning the fuel in compressed air compressed by a compressor, and supplying generated combustion gas to a turbine, the gas turbine comprising:
   means for pressurizing a portion of the compressed air compressed by the compressor, the portion of the compressed air having flowed into the means for pressurizing;
   means for cooling the combustion chamber with at least a first part of the portion of the compressed air pressurized by the means for pressurizing;
   means for regulating turbine temperature to regulate a temperature of a stationary member of the turbine with at least a second part of the portion of the compressed air pressurized by the means for pressurizing;
   a pressurization supply channel through which the portion of the compressed air is configured to flow from the compressor to the means for pressurizing;
   a combustion chamber supply channel through which at least the first part of the portion of the compressed air is configured to flow from the means for pressurizing to the means for cooling the combustion chamber;
   a turbine supply channel through which at least the second part of the portion of the compressed air is configured to flow from the means for pressurizing to the means for regulating turbine temperature;
   means for cooling at least the first part of the portion of the compressed air, the means for cooling at least the first part of the portion of the compressed air being provided in the combustion chamber supply channel;
   means for heating at least the second part of the portion of the compressed air, the means for heating the at least the second part of the portion of the compressed air being provided in the turbine supply channel;
   a connecting supply channel through which at least the second part of the portion of the compressed air is configured to flow from the means for regulating turbine temperature to the means for cooling the combustion chamber;
   a control device capable of controlling at least one of the means for cooling at least the first part of the portion of the compressed air and the means for heating at least the second part of the portion of the compressed air;
   a first flow rate regulating mechanism provided in the turbine supply channel;
   a second flow rate regulating mechanism provided in the pressurization supply channel;
   a third flow rate regulating mechanism provided in the combustion chamber supply channel; and
   a fourth flow rate regulating mechanism provided in the connecting supply channel;
   wherein the control device is configured to control the first flow rate regulating mechanism to regulate a flow rate of at least the second part of the portion of the compressed air flowing into the means for regulating turbine temperature, control the second flow rate regulating mechanism to regulate a flow rate of the portion of the compressed air flowing into the means for pressurizing, control the third flow rate regulating mechanism to regulate a flow rate of at least the first part of the portion of the compressed air flowing into the means for cooling the combustion chamber, and control the fourth flow rate regulating mechanism to regulate a flow rate of at least the second part of the portion of the compressed air flowing from the means for regulating turbine temperature into the means for cooling the combustion chamber.

2. The gas turbine according to claim 1, wherein:
the stationary member includes a blade ring;
the means for regulating turbine temperature includes a blade ring inner channel defined in the blade ring; and
the connecting supply channel is configured to pass at least the second part of the portion of the compressed air to the means for cooling the combustion chamber from the blade ring inner channel defined in the blade ring at a rated operation of the gas turbine.

3. The gas turbine according to claim 1, wherein:
the control device is configured to control the first flow rate regulating mechanism to close the turbine supply channel, so as to block supply of at least the second part of the portion of the compressed air to the means for regulating turbine temperature.

4. The gas turbine according to claim 1, wherein:
the first flow rate regulating mechanism includes at least one of:
an on-off valve configured to open and close the turbine supply channel; and
a flow rate regulating valve configured to regulate the flow rate of at least the second part of the portion of the compressed air flowing through the turbine supply channel.

5. The gas turbine according to claim 1, further comprising:

means for cooling the portion of the compressed air, the means for cooling the portion of the compressed air being provided in the pressurization supply channel.

6. The gas turbine according to claim 1, wherein:
the control device is configured to control at least one of the means for cooling at least the first part of the portion of the compressed air and the means for heating at least the second part of the portion of the compressed air during a startup operation of the gas turbine so that the combustion chamber is cooled by the means for cooling the combustion chamber and the stationary member of the turbine is heated by the means for regulating turbine temperature;
and the control device is further configured to control at least one of the means for cooling at least the first part of the portion of the compressed air and the means for heating at least the second part of the portion of the compressed air during a rated operation of the gas turbine so that the combustion chamber is cooled by the means for cooling the combustion chamber and the stationary member of the turbine is cooled by the means for regulating turbine temperature.

7. A gas turbine with a control device configured to control an operation of the gas turbine which is configured to acquire rotational power by supplying fuel to a combustion chamber and burning the fuel in compressed air compressed by a compressor and supplying generated combustion gas to a turbine, the gas turbine including:
means for pressurizing a portion of the compressed air compressed by the compressor, the portion of the compressed air having flowed into the means for pressurizing;
means for cooling the combustion chamber with at least a first part of the portion of the compressed air pressurized by the means for pressurizing;
means for regulating turbine temperature to regulate a temperature of a stationary member of the turbine with at least a second part of the portion of the compressed air pressurized by the means for pressurizing;
a combustion chamber supply channel through which at least the first part of the portion of the compressed air is configured to flow from the means for pressurizing to the means for cooling the combustion chamber;
a turbine supply channel through which at least the second part of the portion of the compressed air is configured to flow from the means for pressurizing to the means for regulating turbine temperature;
means for heating at least the second part of the portion of the compressed air, the means for heating at least the second part of the portion of the compressed air being provided in the turbine supply channel;
a connecting supply channel through which at least the second part of the portion of the compressed air is configured to flow from the means for regulating turbine temperature to the means for cooling the combustion chamber; and
a flow rate regulating mechanism provided in the connecting supply channel;
wherein, in a rated operation mode, which is a control mode during rating of the gas turbine, the control device is configured to control the flow rate regulating mechanism to cause at least the second part of the portion of the compressed air to flow from the means for regulating turbine temperature into the means for cooling the combustion chamber.

8. The gas turbine with the control device according to claim 7, further comprising:
means for cooling at least the first part of the portion of the compressed air,
the means for cooling at least the first part of the portion of the compressed air being provided in the combustion chamber supply channel,
wherein an operation method for the gas turbine with the control device comprises:
a startup operation of the gas turbine to cool the combustion chamber by the means for cooling the combustion chamber and to heat the stationary member of the turbine by the means for regulating turbine temperature during the startup operation of the gas turbine; and
the rated operation mode of the gas turbine to cool the combustion chamber by the means for cooling the combustion chamber and to cool the stationary member of the turbine by the means for regulating turbine temperature during the rated operation mode of the gas turbine.

9. An operation method for a gas turbine configured to acquire rotational power by supplying fuel to a combustion chamber and burning the fuel in compressed air compressed by a compressor and supplying generated combustion gas to a turbine, the gas turbine including:
means for pressurizing a portion of the compressed air compressed by the compressor, the portion of the compressed air having flowed into the means for pressurizing;
means for cooling the combustion chamber with at least a first part of the portion of the compressed air pressurized by the means for pressurizing;
means for regulating turbine temperature to regulate a temperature of a stationary member of the turbine with at least a second part of the portion of the compressed air pressurized by the means for pressurizing;
a combustion chamber supply channel through which at least the first part of the portion of the compressed air is configured to flow from the means for pressurizing to the means for cooling the combustion chamber;
a turbine supply channel through which at least the second part of the portion of the compressed air is configured to flow from the means for pressurizing to the means for regulating turbine temperature;
means for heating at least the second part of the portion of the compressed air, the means for heating at least the second part of the portion of the compressed air being provided in the turbine supply channel;
a connecting supply channel through which at least the second part of the portion of the compressed air is configured to flow from the means for regulating turbine temperature to the means for cooling the combustion chamber; and
a flow rate regulating mechanism provided in the connecting supply channel;
wherein:
in a rated operation of the gas turbine, the flow rate regulating mechanism is controlled to cause at least the second part of the portion of the compressed air to flow from the means for regulating turbine temperature into the means for cooling the combustion chamber;
the stationary member includes a blade ring;
the means for regulating turbine temperature includes a blade ring inner channel defined in the blade ring; and
the connecting supply channel is configured to pass at least the second part of the portion of the compressed air to the means for cooling the combustion chamber from the blade ring inner channel defined in the blade ring at the rated operation of the gas turbine.

10. The operation method for the gas turbine according to claim 9, wherein:
  the gas turbine further includes means for cooling at least the first part of the portion of the compressed air, the means for cooling at least the first part of the portion of the compressed air being provided in the combustion chamber supply channel;
  and the operation method for the gas turbine includes:
  a startup operation of the gas turbine to cool the combustion chamber by the means for cooling the combustion chamber and to heat the stationary member of the turbine by the means for regulating turbine temperature during the startup operation of the gas turbine;
  and the rated operation of the gas turbine to cool the combustion chamber by the means for cooling the combustion chamber and to cool the stationary member of the turbine by the means for regulating turbine temperature during the rated operation of the gas turbine.

* * * * *